(12) United States Patent
Asghari et al.

(10) Patent No.: US 10,330,864 B2
(45) Date of Patent: Jun. 25, 2019

(54) CONSTRUCTION OF INTEGRATED MODE TRANSFORMERS

(71) Applicant: Mellanox Technologies Silicon Photonics Inc., Monterey Park, CA (US)

(72) Inventors: Mehdi Asghari, Pasadena, CA (US); Wei Qian, Torrance, CA (US); Pegah Seddighian, Pasadena, CA (US); Bradley Jonathan Luff, La Canada Flintridge, CA (US); Dazeng Feng, El Monte, CA (US); Joan Fong, San Marino, CA (US); Cheng-Chih Kung, San Gabriel, CA (US); Monish Sharma, Artesia, CA (US)

(73) Assignee: Mellanox Technologies Silicon Photonics Inc., Monterey Park, CA (US)

( * ) Notice: Subject to any disclaimer, the term of this patent is extended or adjusted under 35 U.S.C. 154(b) by 96 days.

(21) Appl. No.: 15/382,481

(22) Filed: Dec. 16, 2016

(65) Prior Publication Data

US 2018/0172909 A1  Jun. 21, 2018

(51) Int. Cl.
*G02B 6/14* (2006.01)
*G02B 6/12* (2006.01)
*G02B 6/122* (2006.01)
*G02B 6/136* (2006.01)

(52) U.S. Cl.
CPC ............. *G02B 6/14* (2013.01); *G02B 6/1228* (2013.01); *G02B 6/136* (2013.01); *G02B 2006/12061* (2013.01)

(58) Field of Classification Search
CPC .................................. G02B 6/14; G02B 6/136
USPC ............................................................ 385/43
See application file for complete search history.

(56) References Cited

U.S. PATENT DOCUMENTS

| | | | | |
|---|---|---|---|---|
| 4,773,720 A | * | 9/1988 | Hammer | G02B 6/262 385/131 |
| 5,078,516 A | * | 1/1992 | Kapon | G02B 6/1228 385/129 |
| 6,064,149 A | * | 5/2000 | Raina | H01J 3/022 313/309 |
| 6,229,947 B1 | * | 5/2001 | Vawter | G02B 6/1228 385/131 |
| 6,310,995 B1 | * | 10/2001 | Saini | B82Y 20/00 385/28 |
| 6,330,378 B1 | * | 12/2001 | Forrest | G02B 6/12002 372/50.21 |
| 6,980,720 B2 | * | 12/2005 | Gothoskar | G02B 6/1228 385/129 |

(Continued)

FOREIGN PATENT DOCUMENTS

EP    2544319 A1 *  1/2013

*Primary Examiner* — Akm E Ullah
(74) *Attorney, Agent, or Firm* — Gavrilovich, Dodd & Lindsey, LLP

(57) ABSTRACT

An optical device includes a waveguide on a base and a taper on the base. The waveguide and the taper are optically aligned such that the taper and the waveguide exchange light signals during operation of the device. The taper is configured to guide the light signals through a taper material and the waveguide is configured to guide the light signals through a waveguide medium. The taper material and the waveguide medium are different materials and/or have different indices of refraction.

15 Claims, 11 Drawing Sheets

(56) References Cited

U.S. PATENT DOCUMENTS

| | | | | |
|---|---|---|---|---|
| 7,539,373 B1* | 5/2009 | Logvin | ............... | G02B 6/12004 |
| | | | | 385/28 |
| 8,064,741 B2* | 11/2011 | Cherchi | .................... | G02B 6/14 |
| | | | | 385/28 |
| 9,465,163 B2* | 10/2016 | Kumar | .................... | G02B 6/122 |
| 9,664,855 B2* | 5/2017 | Sodagar | .................... | G02B 5/20 |
| 9,946,029 B2* | 4/2018 | Shi | .......................... | G02B 6/305 |
| 2005/0058416 A1* | 3/2005 | Hoon Lee | ............... | B82Y 10/00 |
| | | | | 385/122 |
| 2007/0147762 A1* | 6/2007 | Kwakernaak | .......... | B82Y 20/00 |
| | | | | 385/131 |
| 2015/0316720 A1 | 11/2015 | Yang et al. | | |
| 2015/0346430 A1* | 12/2015 | Li | ......................... | G02B 6/1228 |
| | | | | 385/28 |
| 2016/0131837 A1 | 5/2016 | Mahgerefteh | | |
| 2016/0139334 A1* | 5/2016 | Sakakibara | ........... | G02B 6/1228 |
| | | | | 385/43 |
| 2017/0254951 A1 | 9/2017 | Dumais et al. | | |

\* cited by examiner

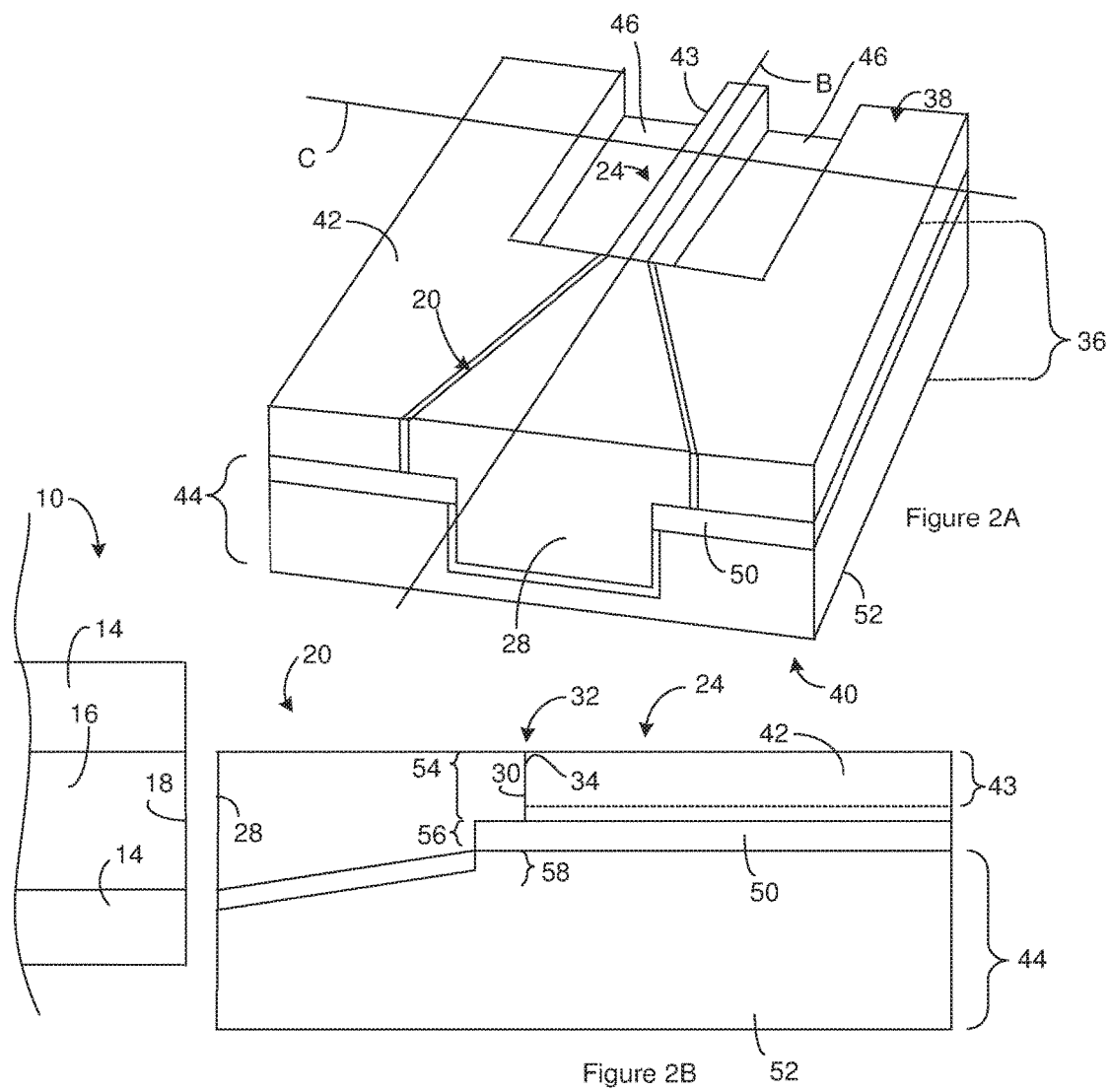

CONSTRUCTION OF INTEGRATED MODE TRANSFORMERS

FIELD

The present invention relates to optical devices and more particularly to optical devices that include a mode transformer.

BACKGROUND

A variety of optical devices have one or more waveguides positioned on base. The waveguides often guide light signals to other optical components such as modulators, switches, demultiplexers, and light sensors. These waveguides often receive the light signals from an external second optical device and/or guide the light signals to the external optical device. Accordingly, the light signals are often transferred between a waveguide on the optical device and an external optical device such as an optical fiber.

The mode size for the waveguide is often different than mode size of the external optical device. For instance, the mode size of waveguides on planar optical devices is often smaller than the mode size of the optical fibers with which the planar optical device exchanges light signals. The difference in mode size is a source of optical loss that may limit device performance. In order to address this issue, a taper is often added to the waveguide that exchanges light signals with the second optical device. For instance, the waveguide on a planar optical device can be tapered such that the mode size of a light signal carried in the waveguide expands to the mode size of the optical fiber with which the waveguide will exchange light signals.

Fabrication of a tapered waveguide on an optical device can interfere with fabrication of the other components on the same optical device. The fabrication challenges become even more evident when the taper is both vertical and horizontal. As a result, there is need for a system that permits the exchange of light signals between different optical devices without complicating the fabrication process.

SUMMARY

An optical device includes a waveguide on a base and a taper on the base. The waveguide and the taper are optically aligned such that the taper and the waveguide exchange light signals during operation of the device. The taper is configured to guide the light signals through a taper material and the waveguide is configured to guide the light signals through a waveguide medium. The taper material and the waveguide medium are different materials and/or have different indices of refraction.

A method of fabricating an optical device includes generating an optical device having a waveguide positioned on a base. The method also includes forming a taper on the base. The taper is optically aligned with the waveguide such that the waveguide and the taper exchange a light signals during operation of the device. The taper is also configured to guide the light signals through a taper material. Forming the taper including depositing the taper material on the base. The taper can be formed before or after forming the waveguide.

BRIEF DESCRIPTION OF THE FIGURES

FIG. 2A through FIG. 2D illustrate an optical device that is suitable for use as an optical device in the system of FIG. 1. FIG. 2A is a perspective view of the optical device.

FIG. 2B is a cross section of the optical device shown in FIG. 2A taken along the line labeled B in FIG. 2A.

FIG. 2C is a cross section of the optical device shown in FIG. 2A taken along the line labeled C in FIG. 2A.

FIG. 2D is a perspective view of the optical device shown in FIG. 2A but with a taper and waveguide separated from the optical device.

FIG. 3A is a perspective view of a device precursor where a taper and a waveguide be fabricated. A first mask is positioned on the device precursor.

FIG. 3N is a perspective view of the device precursor of FIG. 3M after the device precursor is etched the first mask is removed.

DESCRIPTION

Figure 1:
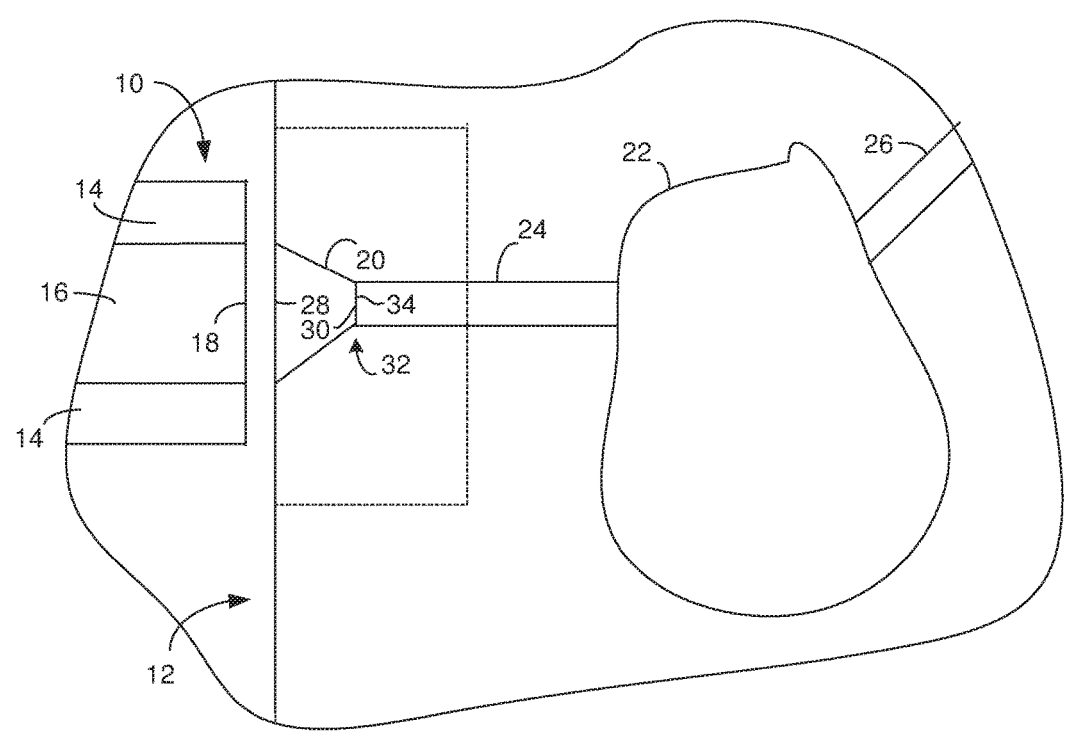
FIG. 1 is a perspective view of a system that includes an optical fiber in communication with an optical device.

A system includes an optical device in optical communication with an external device such as an optical fiber. The optical device includes a taper and a waveguide on a base. The taper is positioned such that the waveguide and the external device exchange light signals through the taper. The taper changes the size and/or shape of the one or more light signal modes as the light signals travel through the taper. The taper is constructed of a different material than the waveguide. As a result, the taper guides the light signals through a different material than the material through which the waveguide guides the light signals. The use of different materials leads to a change in the index of refraction at the interface between the materials. This change in index of refraction is a source of optical loss at the interface between the waveguide and the tapers. However, the inventors have found that an acceptable level of optical loss can be achieved using a butt-coupled arrangement between the taper and the waveguide.

The ability to use different materials for the taper and the waveguide increases the number of possible technologies that can be used to form the taper. For instance, integrated tapers are generally formed by using growth techniques such as epitaxial growth to grow the material for the taper. When the waveguide material is a material such as crystalline silicon, the use of epitaxial growth to form the taper material allows the material for the taper to be precisely matched to the material for the waveguide. This matching of materials ensures a match in the index of refraction of the materials and accordingly ensures a low level of optical loss at the interface between the taper and the waveguide. However, when waveguide material is crystalline silicon and the taper material can be a different material, there need not be a precise match in the index of refraction of the different materials. As a result, techniques such as deposition can be used to form the taper material in place of epitaxial growth.

Epitaxial growth techniques are generally more expensive than deposition techniques. Additionally, epitaxially grown materials are grown on a seed surface that is constructed of the same material as the material that is to be grown, that is continuous, unbroken and has a uniform crystallinity. Changes in the material or in the crystallinity can cause voids, different crystal structures, stress, bandgap discontinuities, and/or even a large quantity of defects in the grown material. The precise requirements for successful use of epitaxial growth limits the approaches that can be used to fabricate the taper. Additionally, epitaxial growth requires the use of high temperatures that can affect device performance and make integration with other devices difficult. Alternatives to epitaxial growth do not have these precise requirements and/or make use of high temperature levels. As a result, the ability to use these approaches expands the number of taper fabrication approaches that can be used. For instance, a taper can be constructed from a combination of multiple different taper structures and the materials for the different taper structures can be deposited in a single continuous deposition. Additionally or alternately, the taper can be fabricated in a way that leaves the optical device with a smooth and continuous upper surface that is suitable for additional processing of the optical device.

FIG. 1 illustrates a system that includes an optical fiber 10 in communication with an optical device 12. In FIG. 1, a cross section of the optical fiber 10 is shown and a topview of the optical device 12 is shown. The optical fiber 10 includes a cladding 14 on a core 16. The core 16 includes a fiber facet 18 through which light signals exit and/or enter the optical fiber 10.

The illustrated portion of the optical device 12 includes a taper 20, an optical component 22, a waveguide 24 and a secondary waveguide 26. The taper 20 includes a first taper facet 28 that is optically aligned with the fiber facet 18. The taper 20 also includes a second taper facet 30 at a waveguide interface 32. The dimensions of the first taper facet 28 can be single mode or multimode and the dimensions of the second taper facet 30 can be single mode or multimode. The waveguide 24 includes a waveguide facet 34 that is optically aligned with the second taper facet 30 at the waveguide interface 32. In some instances, the waveguide facet 34 physically contacts the second taper facet 30. Alternately, an anti-reflective coating can be positioned between the waveguide facet 34 and the second taper facet 30. The waveguide 24 guides light signals between the taper 20 and the optical component 22. The light signals travel through the taper 20 when traveling between the optical fiber 10 and the waveguide 24. The taper 20 can change the size and/or shape of the one or more optical modes of the light signals as they travel though the taper 20. For instance, when the light signals travel from the optical fiber 10 to the optical device 12, the taper 20 can reduce the size and/or shape of the light signal to a size and/or shape that is suitable for the smaller dimensions of the waveguide 24. In some instances, the taper 20 acts as a mode transformer. In some instances, the taper 20 can be configured as an adiabatic mode transformer.

The secondary waveguide 26 is optional and can carry light signals to and/or from the optical component 22. Examples of optical components 22 that can be included on the optical device 12 include, but are not limited to, one or more components selected from a group consisting of facets through which light signals can enter and/or exit a waveguide, entry/exit ports through which light signals can enter and/or exit a waveguide from above or below the optical device 12, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the optical device 12 from the bottom side of the optical device 12 to the top side of the optical device 12. Additionally, the optical device 12 can optionally include electrical components. For instance, the optical device 12 can include electrical connections for applying a potential or current to a waveguide and/or for controlling other components on the optical device 12.

Figure 2D:
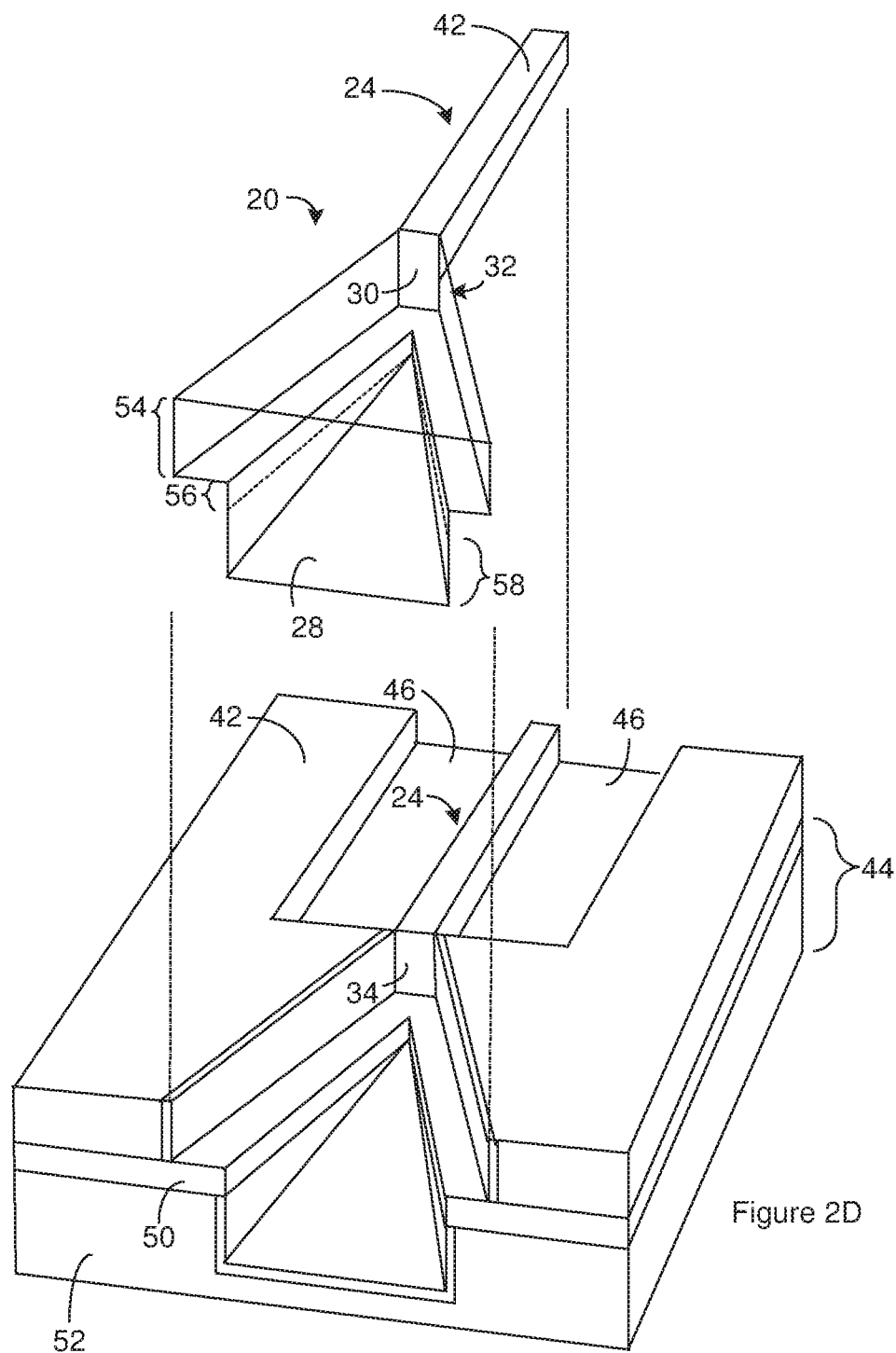

FIG. 2A through FIG. 2D illustrate an optical device that is suitable for use as an optical device 12 in the system of FIG. 1. FIG. 2A is a perspective view of the optical device. FIG. 2B is a cross section of the optical device shown in FIG. 2A taken along the line labeled B in FIG. 2A. A portion of an optical fiber 10 is also shown in FIG. 2B. FIG. 2C is a cross section of the optical device shown in FIG. 2A taken along the line labeled C in FIG. 2A. FIG. 2D is a perspective view of the optical device shown in FIG. 2A but with a taper 20 and a ridge portion of a waveguide 24 separated from the optical device. While FIG. 2A treats the taper 20 as opaque, FIG. 2D treats the taper 20 as transparent.

The optical device is within the class of optical devices known as planar optical devices. Planar optical devices typically include one or more waveguides immobilized relative to a substrate or a base. The direction of propagation of light signals along the waveguides is generally parallel to a horizontal plane of the optical device. Examples of a horizontal plane of the optical device include the topside of the base, the bottom side of the base, the topside of the substrate, and/or the bottom side of the substrate.

The illustrated optical device includes lateral sides 36 (or edges) extending from a topside 38 to a bottom side 40. The propagation direction of light signals along the length of the waveguides on a planar optical device generally extends through the lateral sides 36 of the optical device. The topside 38 and the bottom side 40 of the optical device are non-lateral sides.

The waveguide 24 is configured to guide light signals through a light-transmitting medium 42 that is positioned on a base 44. Accordingly, the light-transmitting medium 42 can serve as the waveguide material. A portion of the waveguide 24 is partially defined by a ridge 43 extending upward from a slab region of the light-transmitting medium 42 as is most evident in FIG. 2C. In some instances, the top of the slab region is defined by the bottom of trenches 46 extending partially into the light-transmitting medium 42 or through the light-transmitting medium 42. Suitable light-transmitting media include, but are not limited to, silicon, polymers, silica, SiN, GaAs, InP and LiNbO$_3$. One or more cladding layers (not shown) are optionally positioned on the light-transmitting medium 42. The one or more cladding layers can serve as a cladding for the waveguide and/or for the optical device. When the light-transmitting medium 42 is silicon, suitable cladding layers include, but are not limited to, silicon, polymers, silica, SiN, GaAs, InP and LiNbO$_3$.

The portion of the base 44 adjacent to the light-transmitting medium 42 is configured to reflect light signals from the waveguide 24 back into the waveguide 24 in order to constrain light signals in the waveguide 24. For instance, the portion of the base 44 adjacent to the light-transmitting medium 42 can be an optical insulator 50 with a lower index of refraction than the light-transmitting medium 42. The drop in the index of refraction can cause reflection of a light signal from the light-transmitting medium 42 back into the light-transmitting medium 42. The base 44 can include the optical insulator 50 positioned on a substrate 52. As will become evident below, the substrate 52 can be configured to transmit light signals. For instance, the substrate 52 can be constructed of a light-transmitting medium 42 that is different from the light-transmitting medium 42 or the same as the light-transmitting medium 42. In one example, the optical device is constructed on a silicon-on-insulator wafer. A silicon-on-insulator wafer includes a silicon layer that serves as the light-transmitting medium 42. The silicon-on-insulator wafer also includes a layer of silica positioned on a silicon substrate. The layer of silica can serve as the optical insulator 50 and the silicon substrate can serve as the substrate 52.

As discussed above, FIG. 2D treats the taper 20 as transparent. As a result, the interior features of the taper 20 are shown in FIG. 2D. The taper 20 includes multiple taper structures and each taper structure has a different combination of horizontal and vertical tapers. For instance, the illustrated taper 20 includes an upper taper 54, a middle taper 56, and a lower taper 58 although a different number of taper structures are possible. The upper taper 54, the middle taper 56, and the lower taper 58 can have one or two features selected from a group consisting of a horizontal taper and a lateral taper. As a result, the taper can be horizontally and/or vertically tapered. The illustrated upper taper 54 has a horizontal taper but does not have a vertical taper. The illustrated middle taper 56 has a horizontal taper but does not have a vertical taper. The illustrated lower taper 58 has a horizontal taper but does not have a vertical taper. Two different taper structures that are adjacent to each other in the taper can have the same combination of horizontal taper and vertical taper. For instance, two adjacent taper structures can each have horizontal taper but no vertical tapers. The tapers in these taper structures can be different as is evident from the upper taper 54 and the middle taper 56 of FIG. 2D. Additional examples of taper differences that can be evident in adjacent taper structures include different taper rates and/or different shapes such as straight and curved.

At least a portion of the different taper structures are optically aligned with the waveguide 24 while another portion of the taper structures are not optically aligned with the waveguide. For instance, in the taper of FIG. 2D, the upper taper 54 is optically aligned with the waveguide facet 34 while the middle taper 56 and the lower taper 58 are not optically aligned with the waveguide facet 34. When a taper structure is optically aligned with the waveguide facet 34 the upper taper 54 structure can include all or a portion of the second taper facet 30 that is optically aligned with the waveguide facet 34. For instance, as is evident from FIG. 2B, the upper taper 54 includes the second taper facet 30 and that second taper facet 30 is optically aligned with the waveguide facet 34 at the waveguide interface 32.

The taper can be butt-coupled to the waveguide 24. For instance, the taper can be constructed such that when the light signal is traveling from the optical fiber 10 to the waveguide 24, the taper structures that are not optically aligned with the waveguide 24 push the light signal into the one or more taper structures that are optically aligned with the waveguide 24 before the light signals enter the waveguide 24. In some instances, this arrangement results in the taper structures that are not optically aligned with the waveguide 24 terminating before reaching the waveguide facet 34. As an example, in the taper of FIG. 2D, the middle taper 56 structure and the lower taper 58 structure push the light signal into the upper taper 54 before the light signal enters the waveguide 24 from the upper taper 54.

The above arrangements of taper structures can provide a butt-coupled arrangement where the light signal enters the waveguide 24 through the waveguide facet 34 rather having one or more taper structures that push the lights signal into the waveguide from above or below the waveguide 24. Butt coupling between the taper and the waveguide 24 provides a more efficient transfer of optical energy between the taper and the waveguide 24. The increased efficiency allows the taper to be constructed of a different material than the light-transmitting medium 42. For instance, the taper can be constructed of an amorphous or non-crystalline material while the light-transmitting medium 42 is a crystalline material. Since the taper material and the waveguide material can be different, the index of refraction for the taper material can be different from the index of refraction for the waveguide material. For instance, the index of refraction for the taper material can be different from the index of refraction for the waveguide material but within 20%, 10% or 5% of the index of refraction of the waveguide material. Suitable materials for the taper material include, but are not limited to, amorphous silicon, Poly Ge, and amorphous Ge. In one example, the taper is amorphous silicon while the waveguide 24 is crystalline silicon.

FIG. 2A through FIG. 2D illustrate the waveguide interface 32 as perpendicular to the base. Additionally, FIG. 2A through FIG. 2D illustrate the waveguide interface 32 as perpendicular to the direction of propagation of light signals through the waveguide at the waveguide facet 34 and also to the direction of propagation of light signals through the taper at the second taper facet 30 at the waveguide interface 32. However, in some instances, the waveguide interface 32 can also be positioned at an angle that is non-perpendicular relative to the direction of propagation of light signals through the waveguide at the waveguide facet 34. In some instances, the waveguide interface 32 is substantially perpendicular relative to the base 20 while being non-perpendicular relative to the direction of propagation of light signals through the waveguide at the waveguide facet 34. The non-perpendicularity of the waveguide facet 34 can reduce the effects of back reflection in the taper and/or the waveguide. Suitable angles for the waveguide interface 32 relative to the direction of propagation of light signals through the waveguide at the waveguide facet 34 include but are not limited to, angles between 80° and 89°, and angles between 80° and 85°.

Figure 3A:
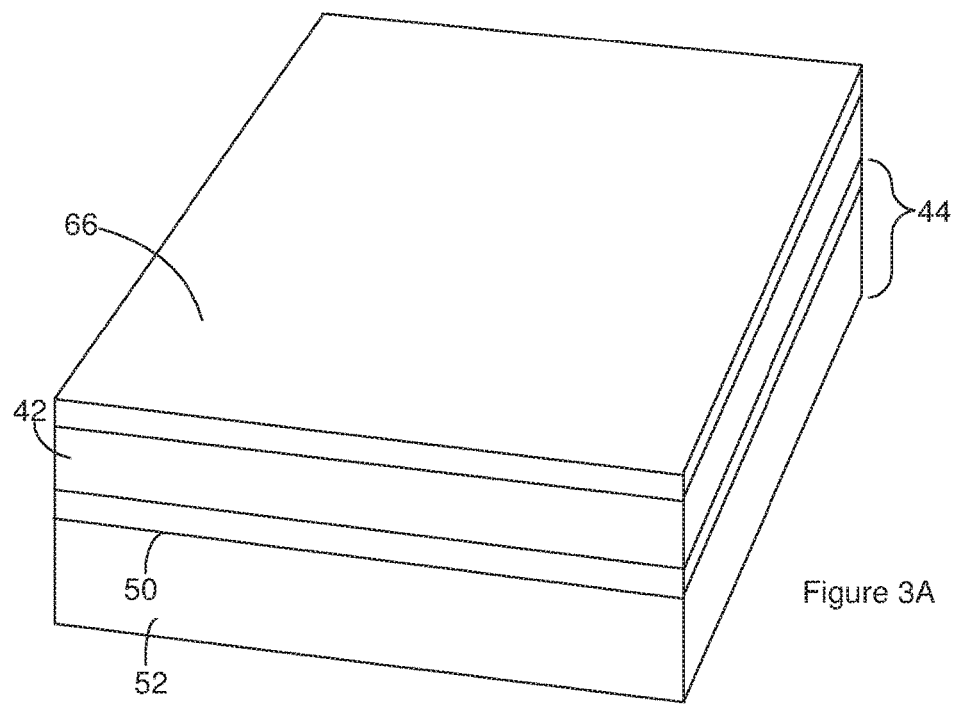
FIG. 3A through FIG. 3N illustrate a method of forming an optical device having an integrated taper.
Figure 3B:
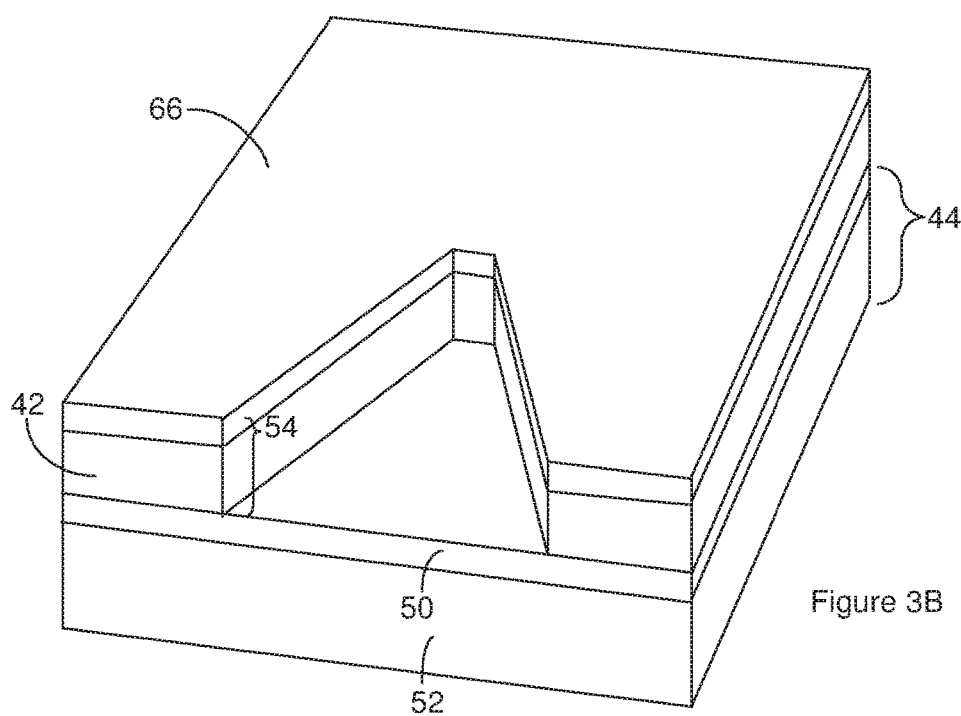
FIG. 3B is a perspective view of the device precursor of FIG. 3A after patterning of the first mask and etching.
Figure 3C:
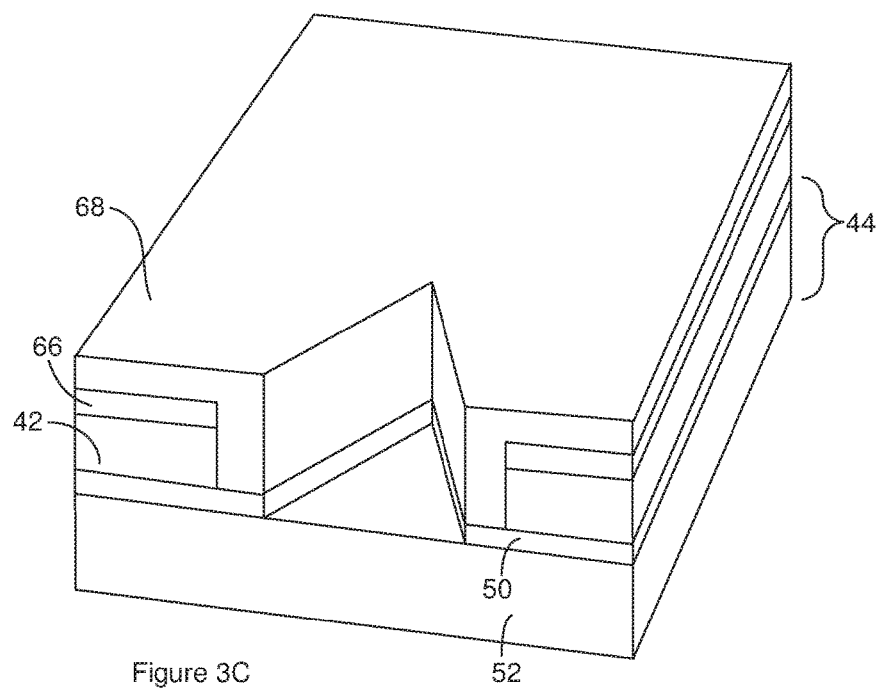
FIG. 3C is a perspective view of the device precursor after formation of a second mask on the device precursor of FIG. 3B, followed by patterning of the second mask and etching of the result.
Figure 3D:
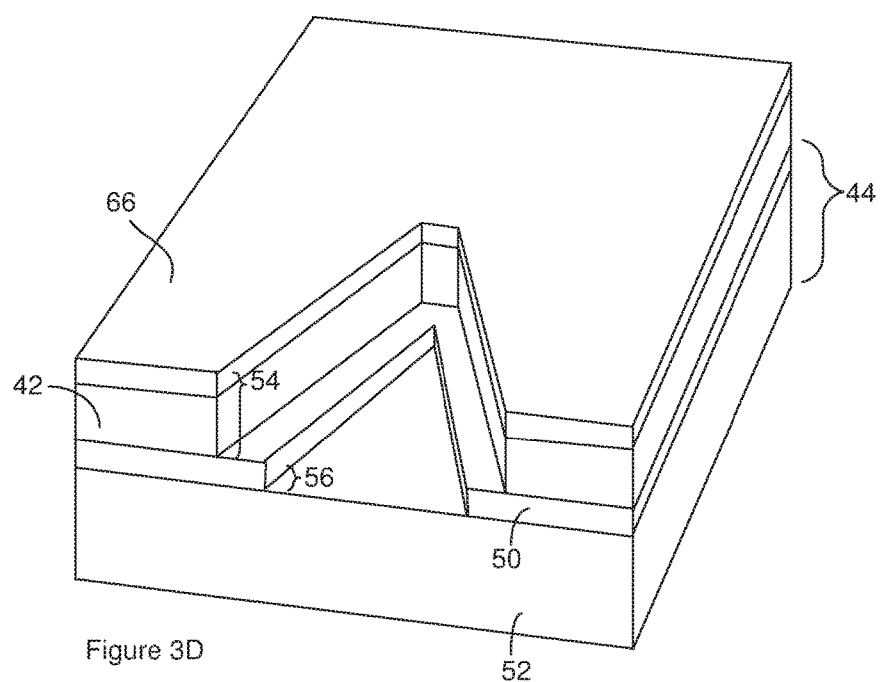
FIG. 3D is a perspective view of the device precursor of FIG. 3B after removal of the second mask.
Figure 3E:
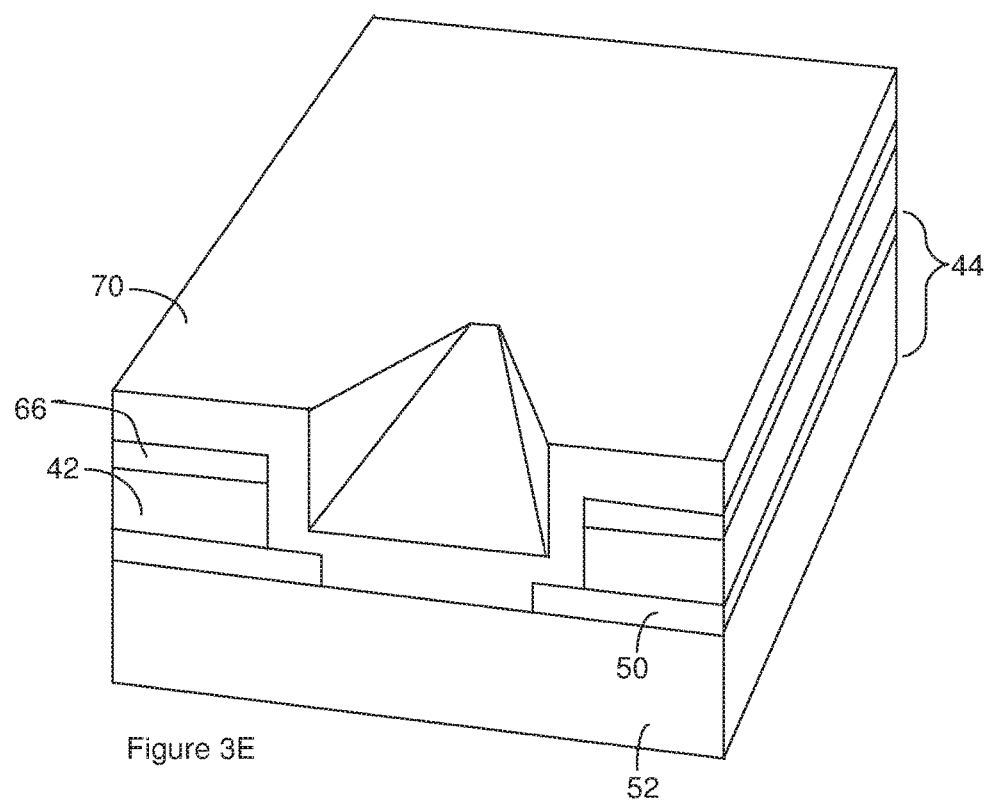
FIG. 3E is a perspective view of the device precursor of FIG. 3B after formation of a third mask over the first mask. The third mask is patterned so as to have a vertically tapered region positioned over the region of the device precursor where a lower taper is to be formed.
Figure 3F:
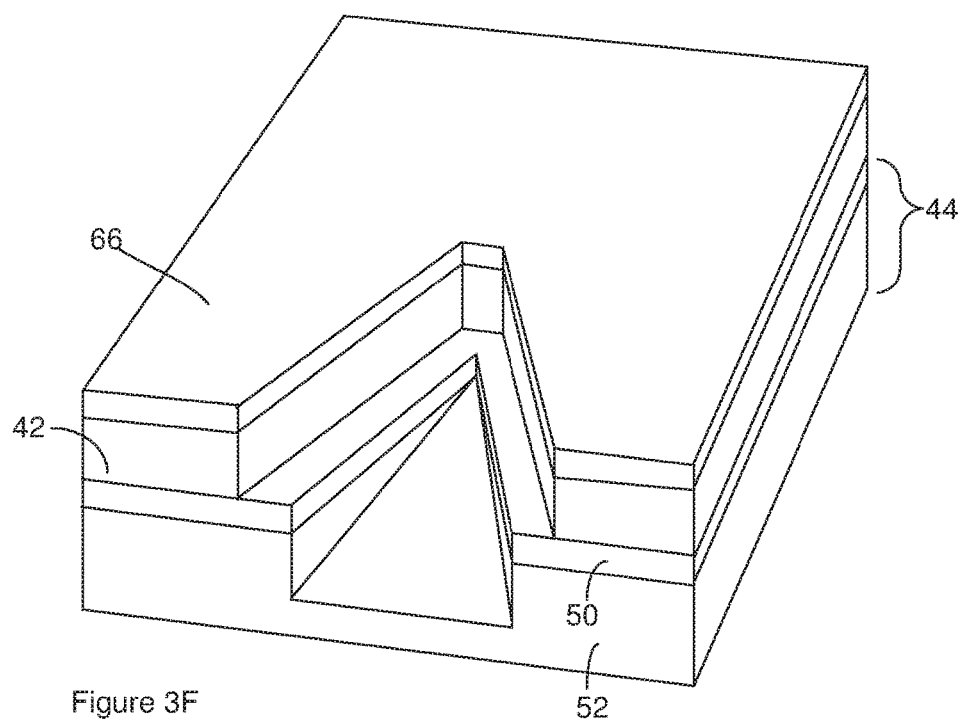
FIG. 3F is a perspective view of the device precursor of FIG. 3E after completion of a third etch and removal of the remaining portions of the third mask.
Figure 3G:
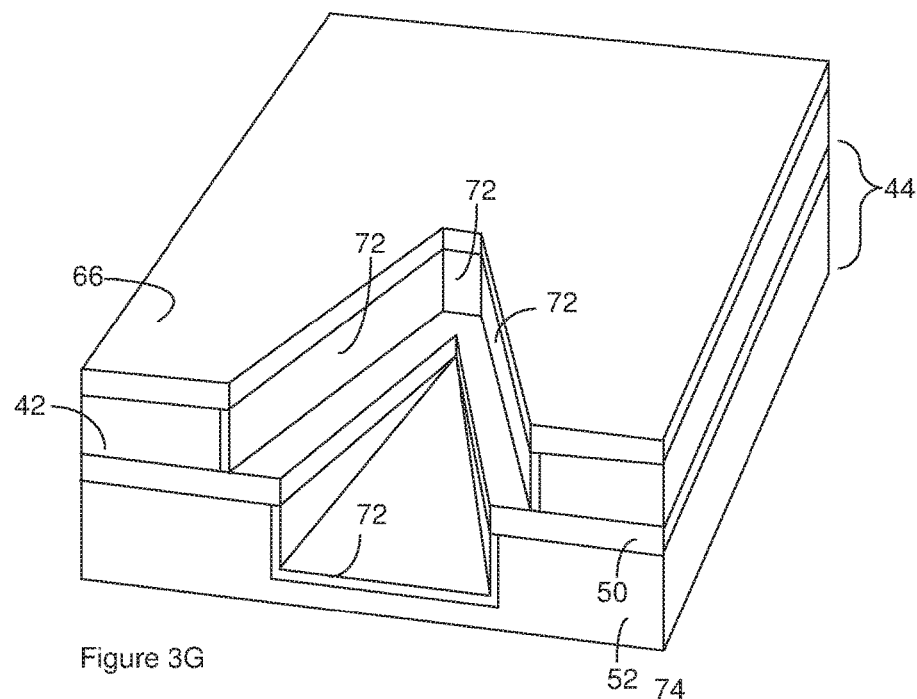
FIG. 3G is a perspective view of the device precursor of FIG. 3F after formation of a fourth mask that protects regions of the device precursor that are not protected by the first mask.
Figure 3H:
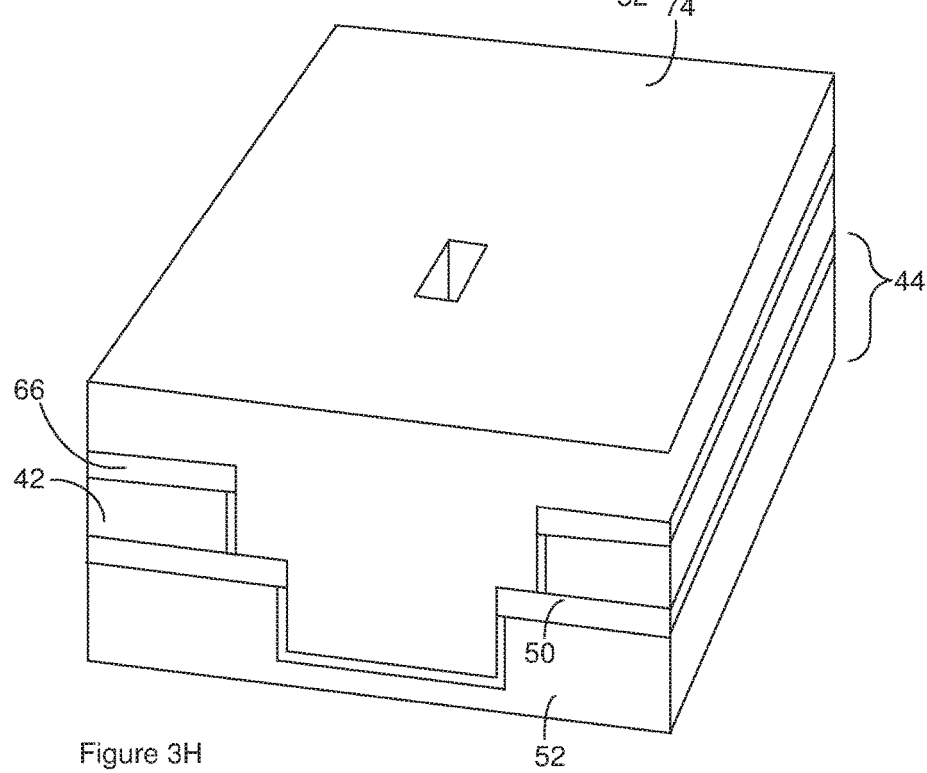
FIG. 3H is a perspective view of the device precursor after formation of a fifth mask over the first mask and the fourth mask. The fifth mask is patterned to include a through hole that extends to the portion of the fourth mask located over a waveguide facet.
Figure 3I:
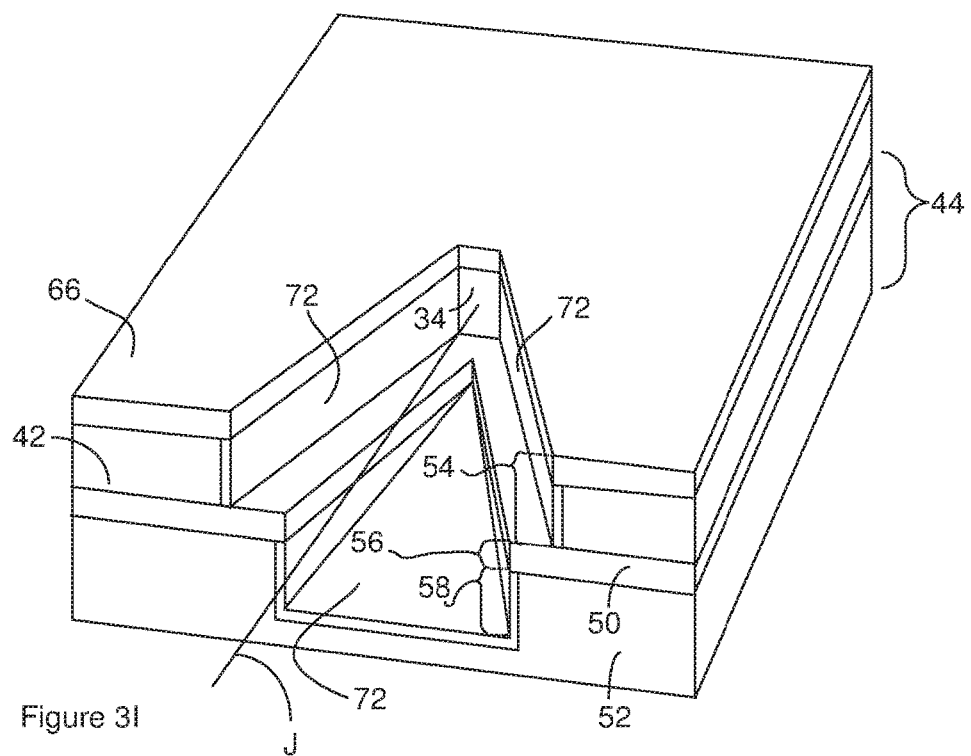
FIG. 3I is a perspective view of the device precursor of FIG. 3H after completion of a fifth etch followed by removal of the fifth mask. The fifth etch removes the fourth mask from the underlying waveguide facet.
Figure 3J:
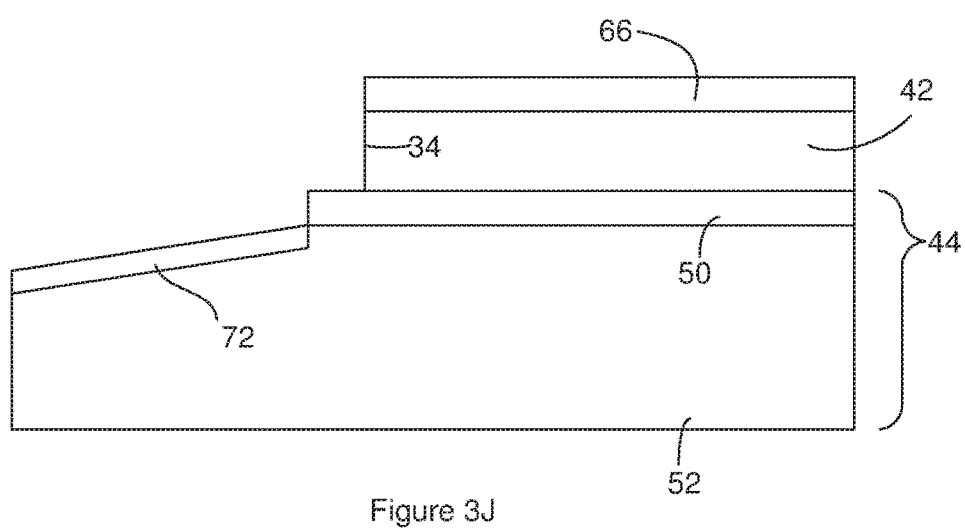
FIG. 3J is a cross section of the device precursor shown in FIG. 3I taken along the line labeled J in FIG. 3I.
Figure 3K:
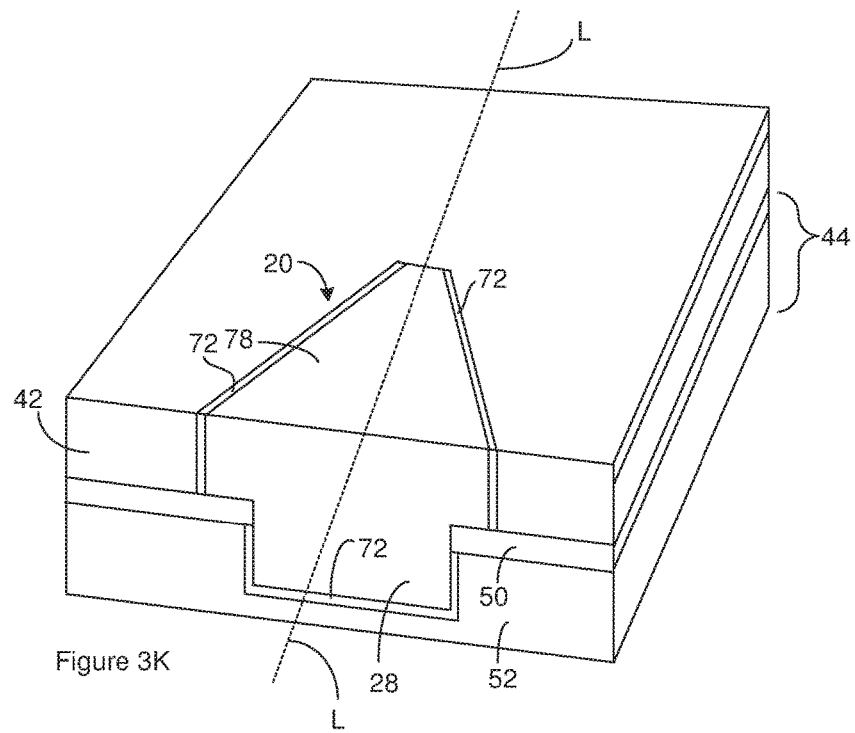
FIG. 3K is a perspective view of the device precursor of FIG. 3I and FIG. 3J after a taper recess is filled with a taper material.
Figure 3L:
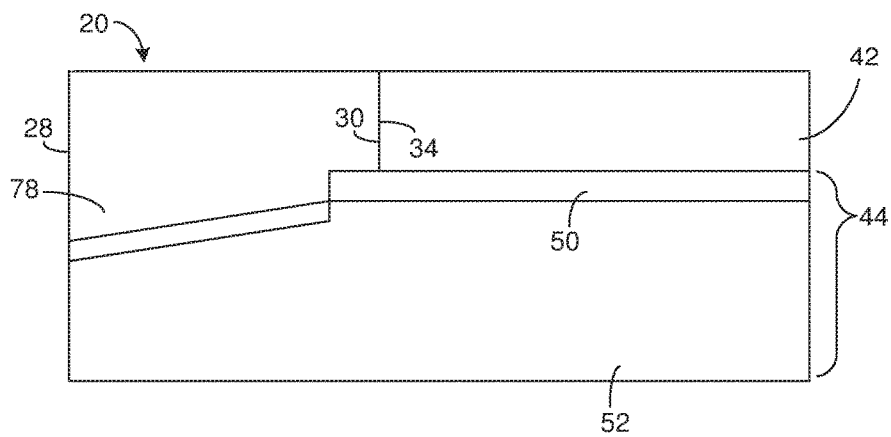
FIG. 3L is a cross section of the device precursor shown in FIG. 3K taken along the line labeled L in FIG. 3K.
Figure 3M:
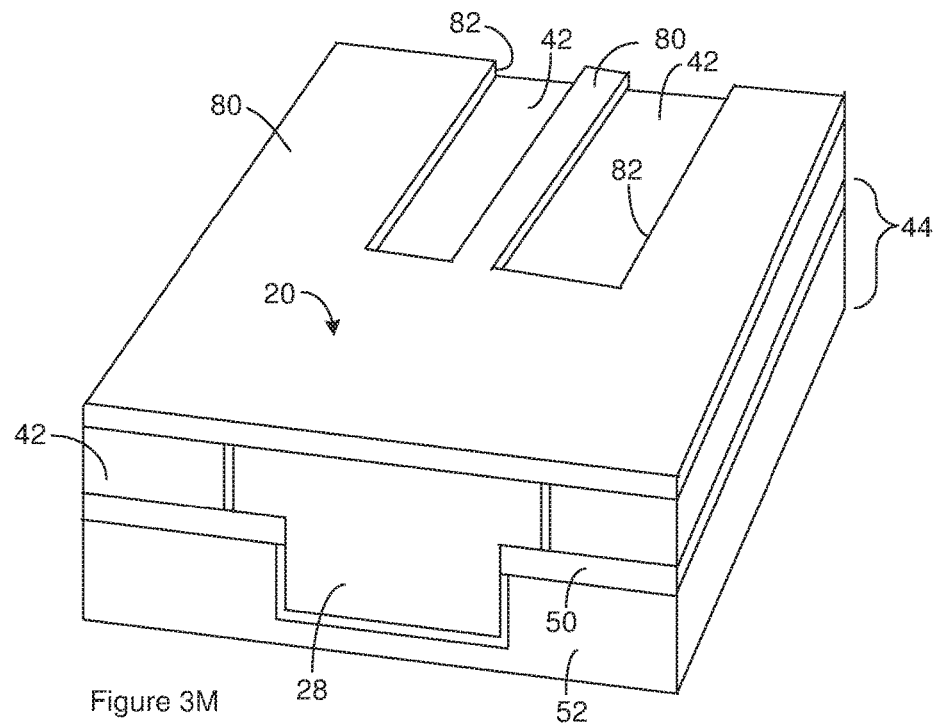
FIG. 3M is a perspective view of the device precursor after formation of a sixth mask on the device precursor of FIG. 3K and FIG. 3L.
Figure 3N:
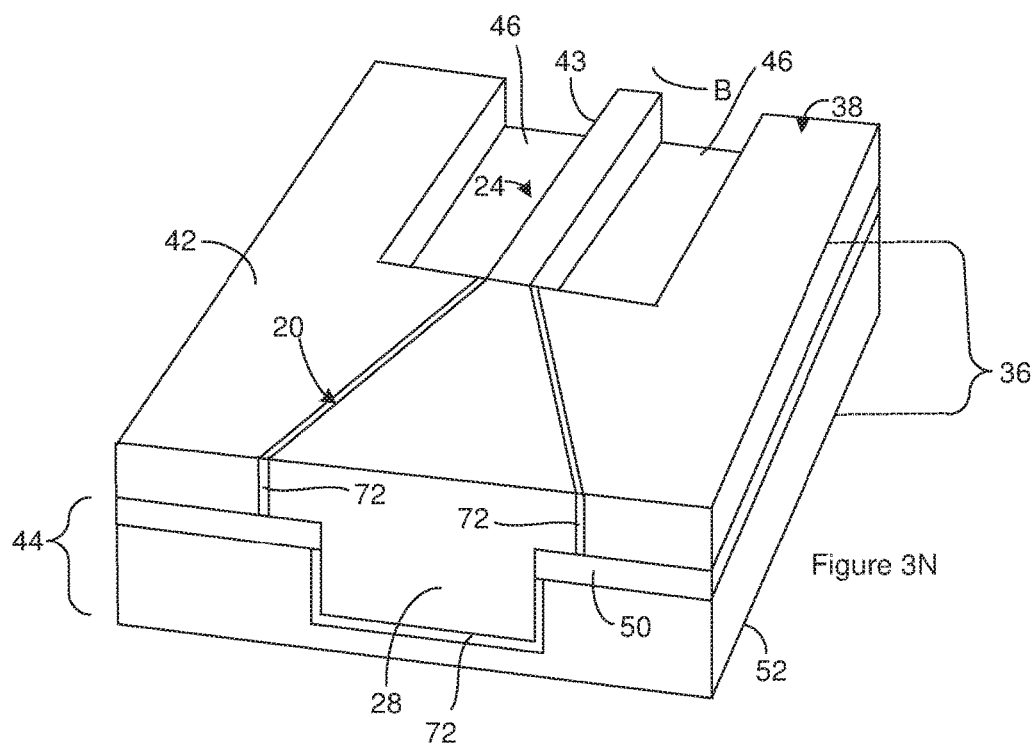

FIG. 3A through FIG. 3N illustrate a method of forming an optical device having an integrated taper. FIG. 3A is a perspective view of a device precursor where the taper and waveguide be fabricated. The illustrated device precursor includes an optical insulator 50 between a substrate 52 and a light-transmitting medium 42. In some instances, the optical insulator 50 between a substrate 52 and a light-transmitting medium 42 are different portions of a silicon-on-insulator wafer or chip. A first mask 66 is formed on the light-transmitting medium 42. A suitable first mask 66 includes, but is not limited to, a hard mask such as silica, SiN, and polymers.

The light-transmitting medium 42 is removed from the region of the device precursor where the upper taper 54 is to be formed. For instance, the first mask 66 can be patterned so as to expose the portion of the device precursor under which the upper taper 54 is to be formed. A first etch can then be performed on the device precursor. In some instances, the first etch is performed for a duration that provides the device precursor of FIG. 3B. FIG. 3B is a perspective view of the device precursor after completion of the first etch. As will become evident below, the first etch defines the upper taper 54 on the device precursor. As is also shown in FIG. 3B, the first etch can be performed for a duration that is sufficient for the first etch to etch through the light-transmitting medium 42 and expose the optical insulator 50. The first etch can be selective for the light-transmitting medium 42. For instance, the first etch can etch the light transmitting medium faster than the first mask 66. A suitable method for patterning the first mask 66 includes, but is not limited to, photolithography, electron beam lithography, and x-ray lithography. A suitable first etch includes, but is not limited to, an anisotropic etch such as reactive ion etching (RIE), a plasma etch), and a chemical etch.

The optical insulator 50 is removed from the region of the device precursor where the middle taper 56 is to be formed. For instance, a second mask 68 can be formed over the first mask 66 and patterned so as to expose the portion of the device precursor under which the middle taper 56 is to be formed while the remainder of the device precursor is protected by the second mask 68. A second etch can then be performed on the device precursor. In some instances, the second etch is performed for a duration that provides the device precursor of FIG. 3C. FIG. 3C is a perspective view of the device precursor after completion of the second etch. As will become evident below, the second etch defines the middle taper 56 on the device precursor. FIG. 3C also shows the second etch performed for a duration that is sufficient for the second etch to etch through the optical insulator 50 and expose the underlying substrate 52. The second etch can be selective for the optical insulator 50. For instance, the second etch can etch the optical insulator 50 faster than the second mask 68. A suitable second mask 68 includes, but is not limited to, SiO2, SiN, and polymers. A suitable method for patterning the second mask 68 includes, but is not limited to, optical expose, electron expose, and x-ray expose. A suitable second etch includes, but is not limited to, an anisotropic etch such as reactive ion etching (RIE), plasma etch, and chemical etch.

The second mask 68 is removed from the device precursor of FIG. 3C so as to provide the device precursor of FIG. 3D. The removal of the second mask 68 exposes portions of the optical insulator 50. As will become evident below, the exposed portions of the optical insulator 50 define the location of the lower taper 58 on the device precursor.

The light-transmitting medium 42 is removed from the region of the device precursor where the lower taper 58 is to be formed. For instance, a third mask 70 can be formed over the first mask 66 on the device precursor of FIG. 3D so as to provide the device precursor of FIG. 3E. The third mask 70 can be and patterned so as to have a tapered region positioned over the region of the device precursor where the lower taper 58 is to be formed. The first mask 66 can protect the remainder of the device precursor or the third mask 70 can protect the remainder of the device precursor as shown in FIG. 3E. As shown FIG. 3E, the tapered region of the third mask 70 can optionally overlap the optical insulator 50. A suitable third mask 70 includes, but is not limited to, SiO2, SiN, and polymers. A suitable method for patterning the third mask 70 to include the tapered region includes, but is not limited to, grayscale photolithography, ebeam lithography, and grating lithography.

A third etch can then be performed on the device precursor of FIG. 3E so as to remove the light-transmitting medium 42 from the region of the device precursor where the lower taper 58 is to be formed. The third etch is performed for a duration that provides the device precursor of FIG. 3F. FIG. 3F is a perspective view of the device precursor after completion of the third etch and removal of the remaining portions of the third mask 70. As is evident from FIG. 3F, the presence of the tapered region in the third mask 70 causes a vertical taper to be in the substrate 52. Accordingly, the tapered region of the third mask 70 is configured such that the desired vertical taper is produced in the substrate 52. The third etch can be selective for the material of the substrate 52. For instance, the third etch can etch the material of the substrate 52 faster than the optical insulator 50. As a result, the portion of the optical insulator 50 located under the third mask 70 defines the location of the lower taper 58 on the device precursor. Since the optical insulator 50 located under the third mask 70 includes a taper (the middle taper 56) as shown in FIG. 3F, the taper of the optical insulator 50 defines the horizontal taper of the lower taper 58. A suitable third etch includes, but is not limited to, an anisotropic etch such as a reactive ion etch (RIE), a plasma etch, and a chemical etch.

A fourth mask 72 is formed on the regions of the substrate 52 and light-transmitting medium 42 that are exposed in the device precursor of FIG. 3F so as to form the device precursor of FIG. 3G. FIG. 3G is a perspective view of the device precursor after formation of the fourth mask 72. Suitable fourth masks 72 include, but are not limited to, silicon dioxide, SiN, and polymers. Suitable methods of forming the fourth mask 72 include, but are not limited to, optical photolithography, electron lithography, and X-ray lithography. When the fourth mask 72 is silicon dioxide, the substrate 52 is silicon, and the light-transmitting medium 42 is silicon, the fourth mask 72 can be formed through a thermal oxide treatment of the device precursor. For instance, the fourth mask 72 can be formed while heating the device precursor in the presence of oxygen so as to convert the exposed silicon to silicon dioxide.

The portion of the fourth mask 72 over the waveguide facet 34 is removed. For instance, a fifth mask 74 can be formed over the first mask 66 and the fourth mask 72 illustrated in FIG. 3G so as to form the device precursor of FIG. 3H. FIG. 3H is a perspective view of the device precursor after formation of the fifth mask 74. The fifth mask 74 can be patterned to include a through hole 76 that extends to the portion of the fourth mask 72 located over the waveguide facet 34. As a result, the portion of the fourth mask 72 located over the waveguide facet 34 is exposed to the atmosphere in which the device precursor is positioned. A suitable fifth mask 74 includes, but is not limited to, SiO2, SiN, and polymers. A suitable method for patterning the fourth mask 72 to include the tapered region includes, but is not limited to, grayscale photolithography, ebeam lithography, and X-ray lithography expose.

A fifth etch is performed on the device precursor of FIG. 3H and the fifth mask 74 is removed so as to provide the device precursor of FIG. 3I and FIG. 3J. FIG. 3I is a perspective view of the device precursor after completion of the fifth etch followed by removal of the fifth mask 74. FIG. 3J is a cross section of the device precursor shown in FIG. 3I taken along the line labeled J in FIG. 3I. As is most evident in FIG. 3J, the fifth etch removes the portion of the fourth mask 72 that was positioned over the waveguide facet 34 from the waveguide facet 34. As a result, the waveguide facet 34 is now exposed. Suitable fifth etches include, but are not limited to, an isotropic etch such as a wet etch, and a dry etch.

In some instances, an anti-reflective coating and/or an index matching coating is optionally formed on the exposed waveguide facet 34. When the waveguide facet 34 is formed from a crystalline silicon material suitable anti-reflective coatings and/or an index matching coatings include, but are not limited to, SiN, multiple layer constructions that include one or more layers selected from the group consisting of SiN, SiO2, and SiON, and other materials with anti-reflective functionality.

The taper recess in the device precursor of FIG. 3J is filled with the taper material 78 and the result is planarized so as to form the device precursor of FIG. 3K and FIG. 3L. FIG. 3K is a perspective view of the device precursor after filling the taper recess with taper material 78. FIG. 3L is a cross section of the device precursor shown in FIG. 3K taken along the line labeled L in FIG. 3K. In some instances, the taper recess is filled with the taper material for each of the taper structures in one continuous deposition process. For instance, the illustrated taper recess can be filled with the taper material for the lower taper 58, middle taper 56, and upper taper 54 in one continuous operation. As a result, the different regions of the taper material 78 need not be formed in different steps.

Suitable methods for filling the taper recess with the taper material include, but are not limited to, deposition processes such as PECVD, LPCVD, and APCVD. Deposition processes can be distinguished from growth process in that in epitaxial growth the grown material follows the atomic structure of the substrate on which it is grown where deposition processes do not need to follow the structure of the substrate on which it is grown. Additionally, as noted above, deposition processes do not have the precise requirements or elevated expense associated with epitaxial growth process. When depositing silicon, these processes produce amorphous silicon.

The one or more processes employed to fill the taper recess can result in excess taper material being positioned above the light-transmitting medium. Any excess taper material and the first mask 66 can be removed. For instance, the device precursor can be planarized so as so as to provide the device precursor with the smooth upper surface illustrated in FIG. 3K. Alternately, the first mask 66 can be removed before filling the taper recess with the taper material. In this instance, the recess can be filled with the taper material and then the excess taper material can be removed. For instance, the device precursor can be planarized so as so as to provide the device precursor with the smooth upper surface illustrated in FIG. 3K. Suitable methods for planarizing the device precursor include, but are not limited to, chemical-mechanical polishing (CMP), and etch back.

As is most evident by comparing FIG. 3J to FIG. 3K and FIG. 3L, the sides of the taper recess are defined by the waveguide facet 34, the fourth mask 72, and the optical insulator 50. The fourth mask 72, and the optical insulator 50 each acts as a cladding for the taper material shown in FIG. 3K and FIG. 3L. In particular, the fourth mask 72 acts as the cladding 60 disclosed in the context of FIG. 2A through FIG. 2D. These materials can be selected to reflect light signals traveling through the taper material 78 back into the taper material 78. For instance, the taper material 78 can have an index of refraction that is higher than the index of refraction for each of the components selected from the group consisting of the first mask 66, the fourth mask 72, and the optical insulator 50. In one example, the first mask 66, the fourth mask 72, and the optical insulator 50 are each silicon dioxide and the taper material 78 is amorphous silicon. Suitable methods for forming the taper material 78 in the taper recess include, but are not limited to, plasma-enhanced chemical vapor deposition (PECVD), and low pressure chemical vapor deposition (LPCVD).

The taper illustrated in FIG. 3K and FIG. 3L is an integral taper in that it is integrated with the optical device. In some instance, external tapers have been used in conjunction with an optical device. External tapers are generally built on a separate chip or device and are subsequently attached to the optical device or device precursor using techniques such as flip chip bonding. External tapers can have a poor mechanical strength, require precise align to the device, provide a discontinuous interface with the device, and generally require a glue between the device and the external taper. Each of these issues affects the cost, performance, and reliability of the resulting device.

The taper illustrated in FIG. 3K and FIG. 3L can also be considered a buried taper because one or more of the taper structures is located below the level of the waveguide or below the bottom of the waveguide. For instance, as is most evident from FIG. 3L, the level of the middle taper 56 and the lower taper 58 is below the level of the bottom of the waveguide. The position of these taper structures below the level of the waveguide allows the device precursor to have the smooth upper surface shown in FIG. 3K and FIG. 3L. In some instance, none of the taper structures is located entirely above the level of the waveguide. In some instances, one of the taper structures is located partially above the level of the waveguide. For instance, as is most evident from FIG. 3L, the level of the middle taper 56 and the lower taper 58 is below the level of the bottom of the waveguide but a portion of the upper taper 54 extends above the level of the upper surface of the waveguide.

The flat and/or smooth upper surface of the device precursor shown in FIG. 3K and FIG. 3L makes the device precursor highly suitable for additional processing. As an example of additional processing, the waveguides 24 and other components can be readily formed on the device precursor of FIG. 3K and FIG. 3L. For instance, a sixth mask 80 can be formed on the device precursor of FIG. 3K and FIG. 3L so as to provide the device precursor of FIG. 3M. FIG. 3M is a perspective view of the device precursor showing the sixth mask 80 patterned to include trench openings 82. The trench openings 82 can extend through the sixth mask 80 so as to expose the light-transmitting medium 42 under the trench openings. Suitable materials for the sixth mask 80 include, but are not limited to, SiO2, SiN, and polymers. Suitable methods for patterning the sixth mask 80 include, but are not limited to, optical lithography, electron lithography, and x-ray lithography.

The light-transmitting medium 42 that is exposed in the trench openings can be removed so as to define a ridge of a waveguide 24. For instance, a sixth etch can be performed on the device precursor of FIG. 3M and the remaining portions of the sixth mask 80 removed so as to form the optical device of FIG. 3N. FIG. 3N is a perspective view of the optical device after the sixth etch is performed and the sixth mask 80 is removed. As is evident from FIG. 3N, this sixth etch forms the trenches 46 that define the waveguide 24 on the optical device. As a result, the sixth etch can be performed for a duration that is sufficient to provide the waveguide 24 ridge with the desired height. The sixth etch can be selective for the light-transmitting medium 42. For instance, the sixth etch can etch the light transmitting medium faster than the sixth mask 80. A suitable sixth etch includes, but is not limited to, photo lithography, electron lithography, and x-ray lithography.

The operations illustrated in FIG. 3A through FIG. 3N can be performed in a sequence other than the illustrated sequence. As an example, the waveguide can be formed before the taper is formed.

Although FIG. 3N illustrates the sixth mask 80 removed from the optical device, the sixth mask 80 can be left on the optical device for additional processing of the optical device.

The optical device illustrated in FIG. 3N can represent the entire optical device or only a portion of the optical device. For instance, FIG. 3N can represent can represent the portion of the optical device within the dashed lines of FIG. 1. Accordingly, the device precursor of FIG. 3A through FIG. 3M can represent the entire device precursor or only a portion of the device precursor.

Figure 3O:
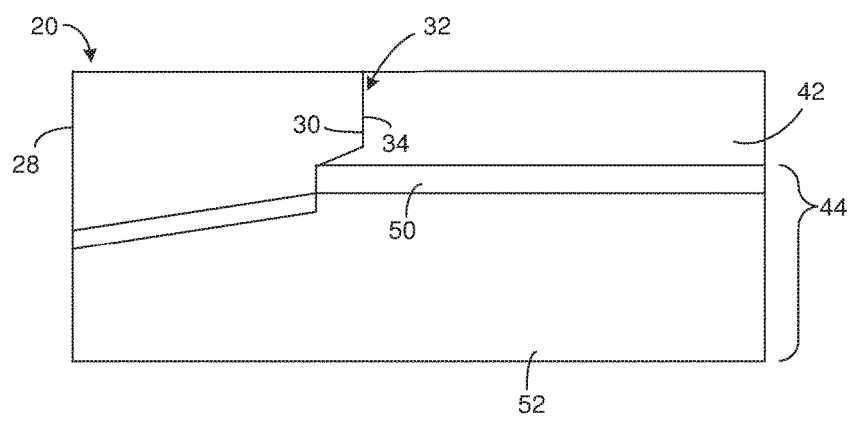
FIG. 3O is a perspective view of a device precursor that illustrates another method of fabricating an optical device.

The method of FIG. 3A through FIG. 3N provide a device precursor where the upper taper 54 has a lateral taper but not a vertical taper. However, the method of FIG. 3A through FIG. 3N can be adapted that the upper taper 54 has a lateral taper and a vertical taper. For instance, FIG. 3O is a cross section of a device precursor where the upper taper 54 has a lateral taper and a vertical taper. The vertical taper can be formed by forming a taper mask on the device precursor after patterning the first mask 66 and before performing the first etch. The taper mask can be formed over the first mask 66 and also over the portion of the device precursor under which the upper taper 54 is to be formed. The taper mask can include a vertically tapered region that is tapered such that the vertical taper that is desired for the upper taper 54 is formed during the first etch. A suitable method of forming the taper mask includes, but is not limited to, grayscale photolithography, electron expose, and grating expose.

Although the systems, optical devices, and device precursors are generally described in the context of light signals traveling toward the waveguide from the taper; additionally or alternately, these systems, optical devices, and device precursors can be operated in reverse. For instance, in these systems, optical devices, and device precursors the light signals can travel from the waveguide and then through the taper.

The system illustrated in FIG. 1 is provided as an example and other system constructions are possible. As a result, the external device need not be a light source such as an optical fiber. For instance, the external device can be a light sensor, light connector, and light splitter. Additionally or alternately, the optical device need not have the illustrated arrangement of the waveguide, optical component and secondary waveguide.

Although the tapers illustrated above are shown positioned at the edge of the optical device, the tapers can be centrally located on the device. Accordingly, the tapers need not be in optical communication with an external device but can provide optical communication between internal components.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a waveguide positioned on a base and optically aligned with a taper on the base such that the taper and the waveguide can exchange light signals during operation of the device;
the taper configured to guide the light signals through a taper material and the waveguide configured to guide the light signals through a waveguide medium,
the taper material having a different index of refraction than an index of refraction of the waveguide medium, and
the taper includes multiple different taper structures arranged such that at least one of the taper structures is located between the base and a level of a bottom of the waveguide.

2. The device of claim 1, wherein the index of refraction of the taper material is within 2% of the index of refraction of the waveguide material.

3. The device of claim 1, wherein the taper material is an amorphous material.

4. The device of claim 3, wherein the waveguide material is a crystalline material.

5. The device of claim 4, wherein the taper material is amorphous silicon and the waveguide material is crystalline silicon.

6. The device of claim 1, wherein none of the taper structures is entirely above a level of a top of the waveguide.

7. The device of claim 6, wherein one or more of the taper structures is optically aligned with a facet of the waveguide and one or more of the taper structures is not optically aligned with a facet of the waveguide.

8. An optical device, comprising:
a device having a waveguide on a base and a taper on the base such that the taper and the waveguide can exchange light signals during operation of the device;
the taper guiding the light signals through a taper material and the waveguide guiding the light signals through a waveguide medium,
the taper material being different from the waveguide medium, and the taper includes multiple different taper structures arranged such that at least one of the taper structures is located between the base and a level of a bottom of the waveguide.

9. The device of claim 8, wherein the taper material is amorphous and the waveguide material is crystalline.

10. The device of claim 1, wherein a top of the waveguide medium is co-planar with a top of the taper medium that is located at a top of the taper.

11. The device of claim 1, wherein a top of the waveguide medium and a top of the taper medium located are included in a continuous surface.

12. The device of claim 1, wherein a cladding contacts the taper and is located between the base and taper.

13. The device of claim 8, wherein a top of the waveguide medium is co-planar with a top of the taper medium that is located at a top of the taper.

14. The device of claim 8, wherein a top of the waveguide medium and a top of the taper medium located are included in a continuous surface.

15. The device of claim 8, wherein a cladding contacts the taper and is located between the base and taper.

\* \* \* \* \*